Jan. 6, 1970     A. E. SIERZPUTOWSKI     3,488,162
OXIDATIVE TREATMENT OF URANIUM ORE PRIOR TO ACID LEACH
Filed Oct. 20, 1967     3 Sheets-Sheet 1

Inventor
Adam E. Sierzputowski
By Cushman, Darby & Cushman
Attorneys

_United States Patent Office_

3,488,162
Patented Jan. 6, 1970

3,488,162
OXIDATIVE TREATMENT OF URANIUM ORE PRIOR TO ACID LEACH
Adam E. Sierzputowski, 1019 Queen St. E.,
Sault Ste. Marie, Ontario, Canada
Filed Oct. 20, 1967, Ser. No. 676,765
Int. Cl. C22b 61/04, 3/00
U.S. Cl. 23—322         5 Claims

ABSTRACT OF THE DISCLOSURE

Uranium is leached from its finely divided ores by the use of dilute, sulfuric acid to form soluble uranium sulfate. Additives such as sodium chlorate, manganese dioxide or ferric salts may be added to accelerate the process. Favourable results are achieved by the use of entrained oxygen in the presence of a base and preferably a surfactant together with thorough agitation.

---

Figure 1:
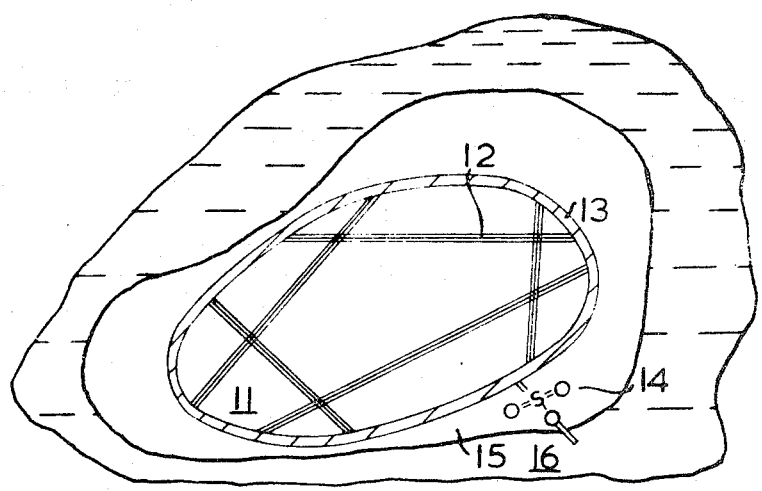

A widely used process for the extraction of uranium from uranium-bearing ores consists in grinding the ore very finely in water, making a slurry or "mill feed pulp" from the finely ground ore and then leaching the pulp under agitation in order to dissolve the uranium present. Dilute sulphuric acid is used to bring the uranium into solution as uranium sulphate. The addition of sodium chlorate, manganese dioxide or a ferric salt to the leaching solution in order to accelerate the leaching process is known. The mixture from the leaching process is then filtered and thus a solution of the uranium salts is obtained along with other metal salts which are present as impurities. After pH adjustment and clarification the solution may go to an ion exchange system where the uranium in solution is absorbed on ion exchange resin and then eluted therefrom to give a higher concentration uranium salt solution.

This method of extraction requires a relatively long leaching time. Leaching cycles of up to 65 hours and even longer are sometimes required for substantially complete removal of uranium from the ore. For any given process conditions this time varies with fluctuations in economic factors such as wages and raw material prices.

The conventional acid leaching of uranium from its ore as known in the prior art is briefly described here.

The ore is subjected to primary secondary and tertiary crushing followed by rod and ball milling. The ore is normally very finely ground. As the leaching of ore must be carried out in a pulp with a very high percentage of solids it is necessary to remove considerable water from the pulp which has been pumped from the grinding section. This removal can be accomplished by allowing some settling of the solids to take place in a large neutral thickener. As much water is removed from the thickener overflow outlet as is compatible with retaining a free flowing pulp. This thickened pulp is removed by diaphragm pumps and constitutes disc filter feed. The clear water overflow from the thickener trays is collected and returned to the grinding section.

These filters are the second stage in the operation to obtain a pulp of sufficiently high solid content to be suitable for leaching. Each filter consists of ten discs, 8 feet, 10 inches in diameter, suspended in the pulp. These discs rotate in the pulp and a vacuum is applied. The solids stick to the surface of the disc and much of the water passed through the filter medium and is returned to the neutral thickener or grinding section. The filtered solids are removed from the discs and discharged to a repulper. As these filtered solids may now be too high in percentage solids, some water is commonly added before delivery to the leaching section. The addition of this water affords the necessary control in pulp density for the feed to the leaching circuit.

The leaching circut may consist of two "pachucas" and five agitators. The pachuca is a cylinder having a conical bottom and bearing no centre column or rakes. Agitation is provided by compressed air which is blown into the bottom of the tank. The "Dorr" agitator is a cylindrical tank with a flat bottom having a stainless steel column in the centre on which rakes are supported. These rakes agitate the pulp to keep the solids in suspension. Since this agitation is not enough to keep the solids from sinking to the bottom, additional air is blown into the pulp through six air ports situated evenly around the circumference of the tank. A third means of agitation is provided by an air lift in the centre column. If the solids should settle out, it is necessary to drain the tank. This is a procedure that is both costly and time consuming. The pulp enters the hollow centre column at the bottom and rises up the column to a height slightly above the pulp in the rest of the agitator. When air is blown up the centre column, the pulp flows upwards, and discharges on the surface of the pulp. Therefore, it is possible to keep the pulp in constant motion. The pulp flows by gravity from one agitator to the next agitator until it discharges into the surge tank.

For every ton of ore entering the leaching section, 50–95 pounds of sulphuric acid are added to the circuit. The acid leaches the uranium from the ore, along with other metals such as thorium, titanium, aluminum and iron. To aid in the extraction of uranium, an oxidizing agent such as sodium chlorate is frequently added.

To shorten the required retention time for uranium dissolution, the pulp is usually heated to 140 to 165 degrees Fahrenheit. Retention time of the pulp is about 50 to 70 hours. That is, the ore entering the circuit will have been in the leaching tanks for 50 to 70 hours before overflowing from the last agitator. During this time the uranium is almost completely extracted from the ore.

The pulp from the leaching section is pumped into the pH adjustment tanks. The acidity of the uranium bearing solution from leaching is too high for direct treatment in the ion exchange plant. Therefore, it is necessary to partially neutralize the acid by adding of lime. After pH adjustment a process of separating the valuable solution from the worthless solids is employed. The first unit in this separation is the washing thickener. The pulp from the last pH adjustment tank is pumped to the washing thickener. The solution overflowing the washing thickener is the feed to ion exchange. The thickened solids are pumped out of the bottom of the washing thickener, and sent to the filtration section.

The underflow from the washing thickeners must be filtered and the solids thoroughly washed to prevent excessive loss of uranium solution in the final filter cake. Therefore, two-stage filtering is used. In the primary stage of the filtration, and underflow from the washing thickener is filtered and washed with water. The cake from the primary filters is then repulped and sent to the secondary filters where a further washing of the cake takes place.

The final cake from these filters should contain very little soluble uranium and is discharged to tailings neutralization.

Lime is added to the tailings, since it is required by law that the waste be at a neutral pH before discharging it to the tailings pond.

The solution, which was separated from the worthless solids in the washing thickener is then ready for further treatment to recover the uranium by ion exchange.

The solution in the unclarified solution storage tank appears to be free of solids but is not clean enough to be treated by ion exchange. Slimes which would block the resin must be removed before the solution goes to the ion exchange. Therefore, the solution is pumped into Whitco clarifiers.

The clear solution from the Whitco clarifiers goes to the clairified pregnant storage tank and then to the ion exchange columns.

The following methods of oxidizing ore have been known in industrial practice for many years.

(a) Exposing ore for a long period of time to the oxidizing effect of humid air. Crushed ore is stored in heaps in the open fields in accordance with this process. However, it may take months or years until a commercially interesting effect is observed from such process.

(b) Roasting or burning the ores in hot oxidizing gases. For reasons of economy, this is applicable only to ore concentrates. However, not all ores can be economically concentrated. Many ores are not responsive to flotation and cannot be concentrated without heavy tailing losses. There would be no profit in roasting poor-grade ores.

(c) The use of oxidizing additives in the leaching medium. Such materials as sodium perchlorate, ferric sulphate, manganese dioxide, sodium chlorate, have been well known. However, the cost of these materials is significant and the benefits arriving from the use of them are minimal when these materials are used in accordance with the prior art processes.

The known processes for leaching of uranium ore by means of sulphuric acid involves the use of relatively large amounts of chemicals. For example, in many places the processing of one ton of uranium ore involves the use of 70 to 80 lbs. of sulphuric acid, 1 to 3 lbs. of sodium chlorate, and 40 to 60 lbs. of lime.

It is common practice in dissolution of uranium from its ores by sulphuric acid to keep the acidity of the leaching medium above a rather high level such as 40 to 80 (or frequently 45 to 55) g. of sulphuric acid per litre of leaching solution. This relatively strong acid is required for leaching of uranium ores with sulphuric since the rate of dissolution of uranium from the ore is very slow unless the acid is of rather high strength.

It is also common to add sodium chlorate in order to provide a strong oxidizing agent. The use of sodium chlorate results in shorter leaching time or in accelerated leaching of the ore. However, the cost of the sodium chlorate is a considerable factor in the over-all cost of the leaching process.

The leaching of uranium with sulphuric acid can be accelerated greatly by increasing the acidity of the leaching medium. However, aside from increasing the cost of the sulphuric acid necessary for processing the ore and increasing the cost of the lime necessary to neutralize the sulphuric acid after the extraction of uranium, it also results in the solution of much more iron from the mineral constituents of the ore. Ferrous ions will then appear in relatively large concentrations in the leaching medium. In large concentrations, ferrous ions exert a chemical action on the ore which is exactly opposite to the chemical reaction desired. For example, sodium chlorate brings about an oxidizing effect on the ore but ferrous ions will bring about a reducing effect. This is believed to be part of the reason why sodium chlorate may be effective in accelerating leaching of uranium ores.

The amount of iron dissolved in the leaching process should be kept to a minimum because all the iron dissolved will later have to be precipitated during the later extraction of the uranium from the leaching solution. This raises the lime requirement in the precipitation of the iron. Thus it can be seen that increasing the acid consumption for extraction of uranium from the ore is not the cheapest way to increase recovery of uranium from the ore. Increases in the rate of dissolution of uranium of the ore by using an increase in the amount of the sulphuric acid is counterbalanced by increased sulphuric acid costs, increased costs for lime, and other compensating factors. Moreover, sodium chlorate is a very expensive material to use for decreasing the concentration of the ferrous ions in the leaching medium.

Other chemicals have been tried as a substituted for sodium chlorate. For example, ferric sulphate, manganese oxide, sulphur dioxide, sulphur trioxide, and many others have been proposed and occasionally some of these are used where the economic considerations warrant it.

It is well established that fast and efficient dissolution of uranium from uranium ore is facilitated if a new face of the material is constantly being exposed to the chemical action of the leaching medium. This can be achieved as outlined previously by using sulphuric acid of a sufficiently high concentration to provide for continuous dissolution of external strata of the ore. The surface of the ore tends to become polarized and this impedes further leaching of the uranium from the ore.

Air is commonly used for agitation of leaching of ore pulp. Its potential as an oxidizing agent has not been utilized prior to the present invention. In fact, air can be considered to be practically an inert gas when it is used as is commonly found in the industry at the present time as agitating agent to prevent settling of the ore pulp. In the presence of charcoal, air appears to be more chemically active in uranium leaching as an oxidizing agent but the cost of materials and the cost of recovery of the charcoal later renders the use of this material non-economic.

I believe that layers of electrically charged particles drawn from the leaching medium build up on the surface of the ore to form an effective barrier between the ore and the leaching medium. For example, these electrical charges might be caused by friction between particles of the ore. This would be particularly true in respect of the modern practice of utilizing feed pulp of very high density, for example the 76 to 82% solids ore pulp commonly used today. I believe that electrically charged particles are attracted to the fact of the ore and adhere thereto. Moreover it appears that this action is more pronounced with better agitation and higher solids in the ore pulp. This protective shell is subject to attack by strong sulphuric acid solutions and that is why a higher concentration of sulphuric acid is used to overcome this problem of polarization.

Canadian Patent No. 548,572 (issued Nov. 12, 1957—Sulphur Dioxide Leaching of Uranium Containing Materials) describes a process of leaching uranium from its ores in aqueous solution containing sulphur dioxide in the presence of soluble ferric or manganese salts, in sufficient amount to oxidize the tetravalent uranium to soluble hexavalent. This process is uneconomical and is not believed to be presently in use industrially. In any case its technological aspects are different from my new leaching process. The chief material applied in this process is sulphur dioxide which in aqueous solutions and in presence of well diffused air, may be transformed into sulphur trioxide and the latter is supposed to exert a leaching effect on the ore.

One cannot identify two different leaching processes as the same or similar only because either process requires well dispersed air in the leaching medium. The role of air in both processes is not the same. According to Canadian Patent No. 548,572 the air is acting on sulphur dioxide to transform it to sulphur trioxide, and the latter is supposed to be responsible for the dissolution of uranium from its ores. In the present process air is chemically activated to be capable of exerting direct oxidizing action on the ore, thus resulting in dissolution of uranium from its ore. Probably the same air may be able to oxidize ferrous to ferric ions and in this indirect way also may result in an increased rate of leaching.

The present invention is related to my previously filed specification relating to "Process and Apparatus for the Leaching of Uranium Bearing Ores and Additives Used Therewith," as filed in Australia under Ser. No. 15,947/62 and accepted under Australian Patent No. 269,068.

In a preferred embodiment, the processes of the present invention are concerned with the leaching of uranium ores with weak sulphuric acid. Sulphuric acid of relatively low strength can be used such as 2 to 30 g./l. and in certain cases the most preferred range will be 4 to 15 g./l. This refers to grams of sulphuric acid per litre of leaching solution.

The present invention represents a breakthrough in the conditioning of ores to make them more responsive to subsequent chemical treatment in acid solutions. The present invention appears to block very effectively the electrochemical phenomenon known as "polarization" of the surface of the ore. Polarization appears to depend mostly on the character of the ore surface which is exposed to leaching. Up until the present time, it appeared that the only way to overcome the polarization of the surface was to increase the amount of leaching acid employed and this of course greatly increases the cost of the leaching process.

It is well known in modern metallurgy to oxidize the ore prior to or during leaching in order to facilitate extraction of valuable metals from their ores. For example, uranium will not pass from the core into sulphuric solution unless it is available in the ore in the state of oxidation corresponding to its higher level of atomic valency. By oxidation of the valuable parts of the ore, these parts can be rendered more easily soluble in the leaching medium. Many ores are pervaded with a network of mineralized bivalent iron chemical compounds and thorough oxidation of the ore will render it spongy or will cause it to distintegrate through disintegration of the iron rich network in the ore. This of course greatly increases the area of the ore surface exposed to leaching and should result in faster and more complete dissolution of valuable metals from the ore and in lower relative acidity than has previously been known.

The present invention provides a very fast and economical process for leaching of metals from their ores. It appears to extend very considerably the area of the ore surface available for treatment with acid solutions. In other words, it makes ground ore considerably more penetrable to liquids and gases during the leaching thereof. It provides a very efficient protection against polarization of the ore surface during leaching.

In prior art leaching methods there is a point of diminishing returns from finer and finer grinding of the ore. I believe that this is a result of the fact that the surface effects discussed above are more pronounced as the surface of the ore is increased greatly by further grinding.

In accordance with the present method, contrary to the teachings of the prior art not only the efficiency but also the economy of the process will raise as the agitation is increased, the ore is more finely ground, the temperature is elevated, and the sulphuric acid is maintained at a low concentration such as 4 to 15 g. per l. of leaching solution. This is a result of the fact that the presently disclosed method is not believed to depend upon constantly dissolving the face of the ore and exposing a fresh face of the ore particle to overcome the polarization problem. In the present method, the erosion of the surface of the ore particle takes place in such a way as to result in solution of smaller quantities of undesirable and valueless minerals other than the uranium values.

In the case of the present process I have found that finer grinding of the ore results not only in higher efficiency but also in greater economy of the process, and this is true no matter how finely the ore is ground. As previously discussed, the prior art processes reach an optimum particle size at which further grinding may result in increased leaching but only at the cost of increased acid consumption. Because my process overcomes this problem of polarization due to increased surface area, further grinding will increase substantially the efficiency of the process without increasing acid consumption during leaching. This will result eventually in a considerable decrease in lime requirement for adjustment and for iron precipitation as well.

It may be important to ascertain the percentage of oxidation of the ore occurring during the conditioning and also during the leaching stages. The ratio of ferric ions to the total number of ferrous and ferric ions exuding from the ore during leaching should approach 95% for a very fast leaching. For example, if the percentage of ferric ions to total iron ions in the following test calculation is over 95%, it will be found that 97.6% of the uranium will be extracted from the ore in from 5 to 10 hours. The method of calculation of the percentage of oxidation of the ore which has been used in my experiments with uranium ores from Denison Mines Ltd., at Elliott Lake, Ontario, Canada, is as follows:

(1) To approximately 50 grains of pulp add 150 mls. of 40% HCl
(2) Heat to boiling until lead acetate test paper turns white, and continue boiling for 2 to 3 minutes
(3) Filter off the solids and assay solution for $Fe^{+++}$ and $Fe^{++}$
(4) Calculate percent of oxidation by:

$$\frac{Fe^{+++}}{Fe^{+++}+Fe^{++}} \times 100$$

Figure 2:
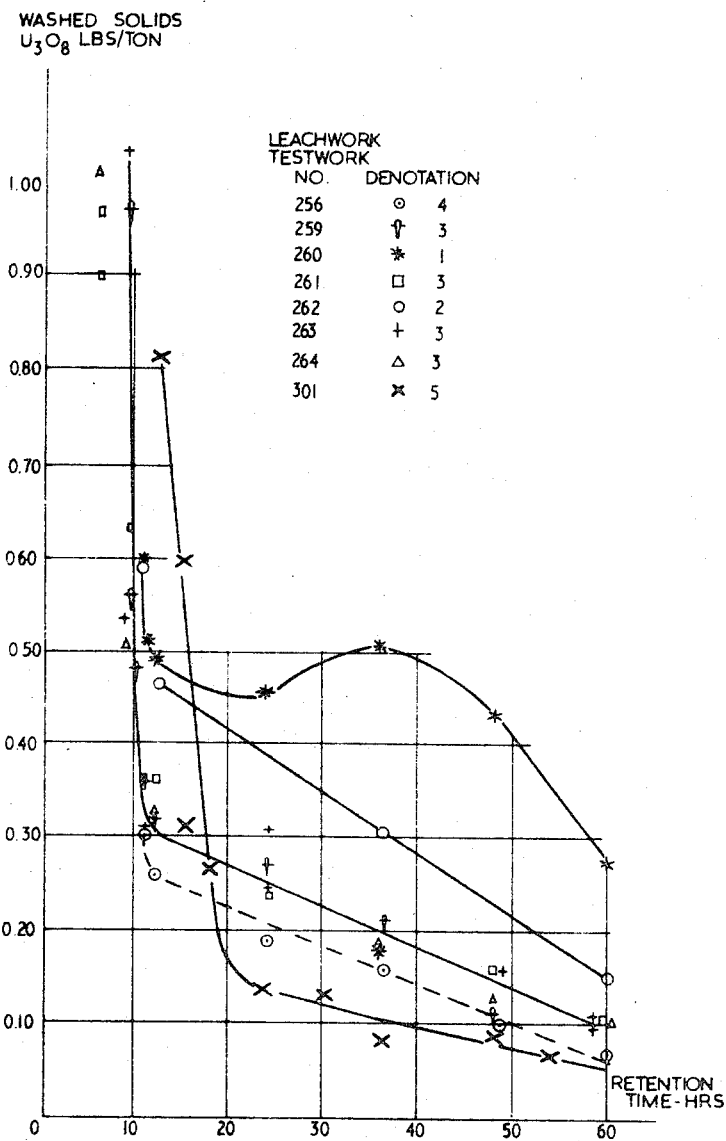
Figure 3:
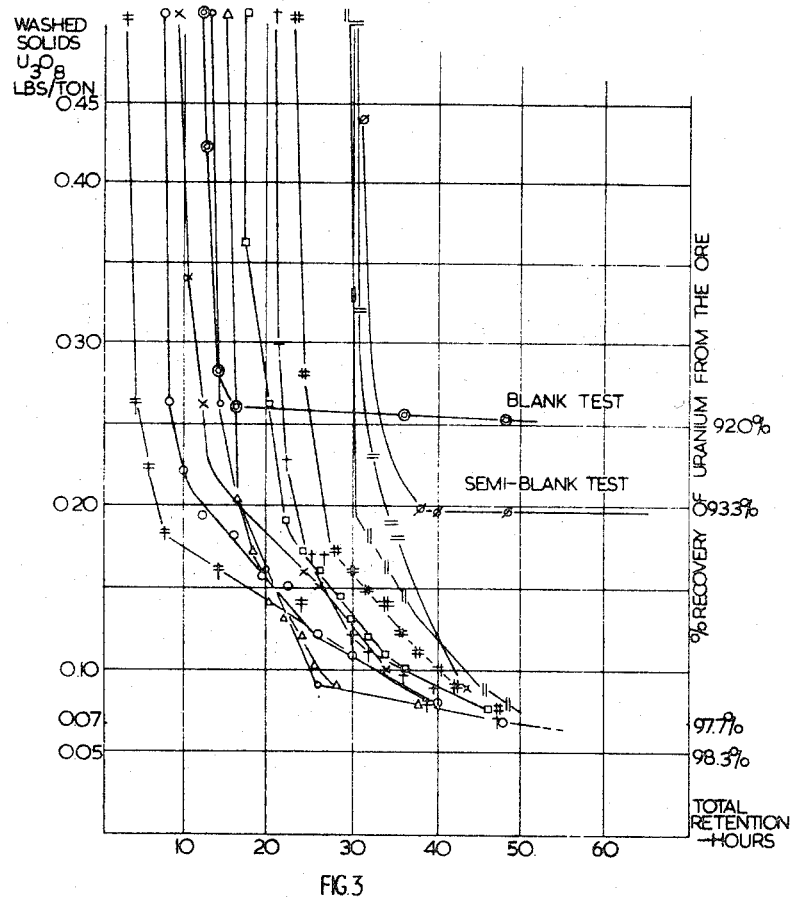

In the drawings which form a part of this specification,
FIGURE 1 is a semi-schematic representation of a typical particle of ore suspended in the conditioning and leaching medium;
FIGURE 2 is a graph of uranium remaining in the ore pulp after extraction for various batches plotted against the retention time;
FIGURE 3 is a similar graph for a series of tests shown in examples 16 to 27.

FIGURE 1, forming a part of this specification is believed to be an accurate representation of the physicochemical condition of a typical particle of uranium bearing ore, shown generally as 11. It is interlaced with a network of material which is rich in bivalent iron and shown as 12. A primary coating of inorganic electric chemically active material such as ferrous or ferroso-ferric oxide is shown as 13. The secondary coating consisting of in this embodiment, a sulphonated organic compound is shown as 14. Part of the air phase forming a bubble substantially around ore particle 11 is shown as 15. The liquid phase of the leaching medium is shown generally as 16. Oxygen is continuously passed between the liquid phase 16 and the ore particle 11 by means of the primary and secondary coatings 13 and 14.

FIGURE 2 of the drawings is a graph illustrating the amount of uranium present in the ore after leaching and it is is measured in pounds of $U_3O_8$ per ton of ore after the washing of said ore. It is entered on the graph against the retention time of the ore in the leaching circuit. This shows the results of five tests which were carried out with Stanrock Uranium Mines Ores from the Elliott Lake area in Ontario, Canada. The results are given for a total retention time of 60 hours in the conditioning and leaching circuits.

In this graph, line No. 1 shows the results of a test in which the ore pulp was not "conditioned" before leaching and no aeration of the type envisaged in the present invention was provided.

Line No. 2 shows the results of a test in which the ore was conditioned, aeration was provided during conditioning and subsequent leaching, and lime was added for control of pH, but no surfactant was provided.

Line No. 3 shows the results of a test during which the ore pulp was conditioned before leaching, a surfactant was provided and aeration was supplied during conditioning and leaching. However, no lime was employed for the control of the pH.

Line No. 4 shows a test in which the ore pulp was conditioned before leaching, lime and surfactant were provided as required and good aeration was provided during conditioning. However, insufficient aeration was provided during the leaching stage.

Line No. 5 corresponds to a test when the pulp was adequately conditioned before leaching, with the application of suitable lime and surfactant, and good aeration was provided during both the conditioning and leaching stages.

I have referred in this specification to the "emulsification" of materials participating in the leaching process. I believe that this term is a proper description of the practical effect of the steps employed in the present process. The emulsification of the solid, gaseous and liquid phases are normally carried out by the use of turbo-propellers, however, any suitable method can be employed. The purpose of the method is to emulsify the materials participating in the leaching and to sustain said state of emulsification by preventing the separation of the phases each from the other. In this emulsion or suspension, air is employed as the principal agent for the oxidation of the ore. It can be mixed intimately with the ore by any suitable means such as turbo-propellers, injection or any means practical under the circumstances.

In accordance with one preferred embodiment of the present invention the ore is mixed before grinding with a small amount of ferrosoferric oxide which is a solid solution of ferrous and ferric oxides and which will be referred to herein as black ferric oxide. However, other substances may be used which perform the same function as black ferric oxide. The functions required are the filling in of cracks and cavities and covering the surface of the ore particles during grinding with a layer of what will be called herein a primary coating. The very extensive surface of polarized ore which during the grinding in the ball mill is covered with chemically active black ferric oxide will later be covered with a secondary coating.

The primary coating whether it is black ferric oxide or another substance capable of performing the same function is a substance which has little or no solubility in slightly acidic conditioning medium of a pH of 3 to 8. The primary coating substance should be electro-conductive to some extent and chemically active. It should be of a type which can be reduced or oxidized with facility, because the function of the primary coating is to serve as a carrier for oxygen which is to be adsorbed by the primary coating from an air-phase of the conditioning medium and subsequently to be delivered to the body of the ore particle.

With the assistance of a secondary coating the black ferric oxide or other material comprising the primary coating behaves like a catalyst undergoing reversibly oxidation-reduction chemical reactions with the final effect that oxygen is effectively transferred from the air phase to the solid phase of the system. There will be an electric potential developed on both sides of the primary coating depending on the substance of which the primary coating is made. This electric potential difference should be as high as possible. This potential may be increased greatly by the addition of certain soluble salts such as ferrous or manganous salts. Preferred forms of the ferrous or manganous salts are the sulphates, chlorides or carbonates.

Another agent which is necessary to obtain the full benefits of the present invention is a material which will produce hydroxyl ions. The preferred materials are ammonia or ammonium hydroxide, or the oxides or hydroxides of sodium, magnesium, potassium, barium, or calcium. With the addition of such an agent, the acidity of the ore conditioning medium can be controlled within the most desirable range of pH 3.5 to 8.0.

The secondary coating of the ore particle is formed by the use of a substance satisfying the following conditions:

(1) Dispersibility or solubility in a conditioning medium.
(2) The ability to concentrate itself in the interface between the gaseous and solid (i.e., air and ore surface), phases of the conditioning medium.
(3) A molecular structure involving one part of the molecule being water-repellent and showing an affinity for the air phase at the concentrations in the conditioning medium in which it is to be used.
(4) The presence of disposable oxygen atoms and room for additional oxygen atoms to be added to its normal molecular structure.

The above substance for the formation of the secondary coating of the ore particles should be capable of existing in two forms with oxygen atoms shuttling alternately in and out of its molecular structure. These substances will be found among some emulsifying, dispersing, surface-active reagents with the molecular structure composed of an organic hydrophobic part with a propensity towards the air phase, and of an inorganic part with a propensity towards the solid phase. This would satisfy the condition of a propensity for concentration at the interface between the air and solid phase. I have found that many organic sulphonated acids or their sodium, potassium, ammonium or other salts comply very well with the above conditions. I have found that when such a substance is placed in the conditioning medium it adheres as a very thin coating to the surface of the finely pulverized ore, preferably over the previously applied primary coating of materials such as black ferric oxide.

Under conditions of good aeration of the conditioning medium a substantial difference of electric potential between the ore body and the conditioning medium will arise which will generate an electrical current flow directed from the conditioning medium to the ore body and result not only in fast oxidation of the ore but also in very effective immunization of its surface against polarization during leaching. Of course, the acidity of the conditioning medium has to be maintained at an adequately low level by the addition of lime or some other source of hydroxyl ions.

Further examples of suitable materials for the secondary coating substance are organic acids consisting of one or two hydrocarbon chains with an anionic polar group such as —SO$_3$Na at one end, or on a carbon atom between two hydrocarbon chains. Materials such as this may be successfully used as secondary coatings provided they have the appropriate attributes of dispersibility or solubility and the propensity for concentration in the interface between the air and solid phases. Some of the materials "collectors" in the flotation of ores have these attributes and may be used as secondary coatings in this process.

I have reason to believe that the sulphonated organic acids may exist in a dual molecular structural form as follows:

SULPHONATE

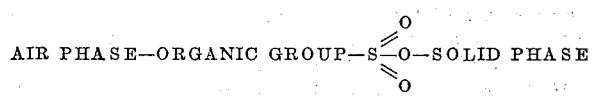

The other form in which it may appear is as follows:

SULPHATE

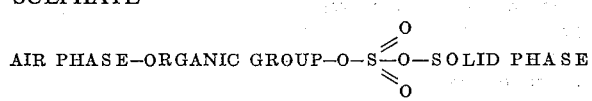

It will be seen that the oxygen atom appears to shuttle alternately in and out of the molecular structure between the sulfur atom and the organic group.

The present invention is believed to operate on a principle of suspending the ore particles in an atmosphere of moist air in which the oxidizing effect of oxygen may be employed to overcome the reducing action of the ore in the ore-conditioning stage. Then when the ore goes on to the second stage or leaching stage, the acid which is present in the moist air environment of the ore particles assists in oxidation of the insoluble trivalent uranium to readily soluble hexavalent uranium which then passes into solution.

The present process separates the oxidizing and leaching functions. The oxidizing function is taken care of in a conditioning stage of the cycle. At a pH of between 3 and 7 and preferably at a pH of about 4 according to a preferred embodiment of the present invention, the sulphonate group is believed to lose an oxygen atom to the ore particle making a sulphate group. Then a sulphate takes an oxygen from the moist air environment around each ore particle to revert to the sulphonate.

The new process of ore conditioning is in one sense a catalytic process. These primary and secondary coatings act as catalysts and their function is at least partly to collect oxygen from the air in the conditioning medium and to deliver it efficiently to the ore. The network of mineralized bivalent iron compounds with which most ores are pervaded is utilized in this process as a carrier for oxygen which thus may reach any constituent of the ore which is oxidizable. In addition, as previously stated, ferrous or manganous salts or other materials rich in ferrous compounds may if soluble or partly soluble in the conditioning medium at the pH of 3 to 7 be added to the ore feed pulp in small amounts to assist in the catalization. I believe that the bivalent iron when added in soluble form to the conditioning medium concentrates as ferrous ions at the interface between the solids and air phases where ferrous ions are oxidized almost instantly due to the catalytic action of the secondary coating.

Subsequently, the ferric ions are absorbed by black ferric oxide primary coating which results in a considerably increased difference in the electrical potential on both sides of the primary coating. This results in an increased density of electrical current flow from the conditioning medium to the ore and in prompt oxidation of the ore. This also assists in the immunization of the ore surface against polarization during leaching.

The ideal method of extracting metals values from its ore in accordance with the present invention is that the ore should be suspended in an environment of moist air and conditioned to overcome the reducing action of the ore in the conditioning stage. The second stage which is the leaching of the ore with an appropriate acid involves more or less further oxidation of the ores to a more soluble form. For example, in the leaching of uranium ore, the trivalent uranium which is almost insoluble is oxidized to hexavalent uranium which is soluble and then dissolved in the leaching medium to be later extracted by conventional processes such as ion exchange methods.

Examples of specific materials which can be employed as the interfacial surface active material are:

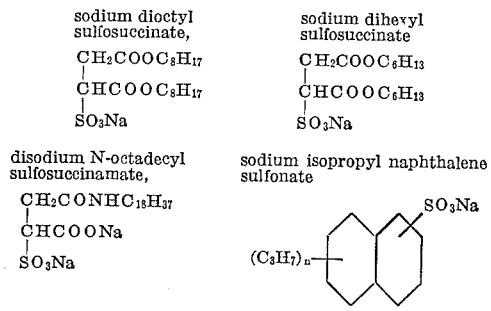

sodium dioctyl sulfosuccinate,
$$CH_2COOC_8H_{17}$$
$$CHCOOC_8H_{17}$$
$$SO_3Na$$

sodium dihexyl sulfosuccinate
$$CH_2COOC_6H_{13}$$
$$CHCOOC_6H_{13}$$
$$SO_3Na$$

disodium N-octadecyl sulfosuccinamate,
$$CH_2CONHC_{18}H_{37}$$
$$CHCOONa$$
$$SO_3Na$$

sodium isopropyl naphthalene sulfonate ammonium dodecyl benzene sulphonate, various alkyl derivatives of sulphonated benzene or naphthalene, sulphonic or di-sulphonic acids, and their sodium or other salts.

Preferred additives are the sulphonic acid derivative of alkyl benzenes or naphthalenes. I believe that these materials have especially desirable properties with regard to concentrating at the interface between the solid and the liquid medium phases. Furthermore, one or more adequately long hydrocarbon chains attached directly to the sulphonated benzene or naphthalene ring will act under the conditions of the present invention differently from its action under normal technological processes. Under the conditions present in this invention the agent may become water repellent to result in separation of a liquid medium from the finely pulverized solid phase and the interposition of air between the two. This phenomenon may be explained by the presence of the alkyl addition to the sulphonated benzene ring. This is of course desirable in insuring that an air cushion or blanket will surround the individual ore particles.

The sulphonated hydrocarbon compounds should preferably be added to the pulp at a concentration of 0.01 to 0.25 lb. per ton of dry ore, before aeration of the pulp.

The present process requires that the leaching medium be saturated with dispersed, partly dissolved air, and provision for a maximum of aeration within limits of economy should be made to attain exceedingly fast leaching of uranium from its ores. I contend further that a certain critical concentration of iron, be it ferric and ferrous ions, dissolved together in the leaching medium and in the presence of some undissolved, finely divided particles of substances consisting mostly of hydrated basic sulphates which are either added or precipitated from the solution at proper pH the rate of dissolution of uranium from its ore may increase rapidly with increasing aeration of the leaching circuit. This may be performed most easily in Pachucas with finely dispersed air introduced at the bottom through a number of jets. Under sufficient excess of pressure an abundance of thoroughly dispersed air may be made to pass through the leaching medium in the leaching circuit of the uranium mill, to result in exceedingly fast leaching never before attained with any leaching process.

Air may be considered as a cheap commodity, if chemically activated so that it can be used as a strong oxidizing agent for a rapid dissolution of uranium for its ores.

Such is the case with the present process. At low sulphuric acid concentration in the leaching medium pH 0.7 up to 2.0, at a temperature within critical range (160°–180° F.) with total iron dissolved at a critical value and with undissolved particles of substances such as black ferric oxide introduced directly to the ore, one may expect that the rate of dissolution of uranium from its ores will increase with increases in the total rate of flow of air dispersed and dissolved and made to pass through the leaching medium.

The new process for leaching uranium ore may require a very fine dispersion of air through the leaching medium. The bubble size is important since the smaller bubbles have a retarded upward velocity and consequently longer retention time in the leaching medium. The longer retention time results in better utilization of available oxygen.

The following example illustrates the importance of depth of the leaching vessel:
Let

| | Units |
|---|---|
| C=upward velocity of air bubbles | Ft./min. |
| H=height of the leaching vessel | Ft. |
| T=retention time | Minutes. |

These variables are related according to the following equation: $H/C$.

From this equation, it can be seen that the retention time of air in the vessel will increase by increasing the height of the vessel or by decreasing the upward velocity of the air. The upward velocity of air can be decreased to a very low rate by emulsification of the leaching medium. It is possible to obtain this state of emulsification with finely pulverized uranium ore by decreasing the surface tension of the liquid and by efficient agitation. The cost of power for this high speed agitation would not be excessive if the surface tension of the liquid is decreased.

This state of emulsification is obtained by homogenization of three separate phases—liquid, solid and gas. If the leaching medium is completely homogeneous, there is a great reduction in the tendency to separate into different phases. At this very advanced stage of the homogenization the ultrafine particles of air may separate from the mixture with great difficulty and only if there is no agitation.

The efficiency of aeration of the leaching medium for the new process is defined as the ratio of oxygen consumed to the total oxygen which entered the leaching vessel with air. It is evident that the efficiency of aeration thus defined is dependent on retention time of air in the leaching medium. The retention time of this air is under the complete control of the leaching operator. The oxidizing effect of air is proportional to the retention time of air in the vessel.

The new leach process does not require air for mechanical agitation. It requires air for the oxygen content only. This is directly opposite to the present high acid leach process. It is possible to achieve without difficulty such advanced homogenization of the leaching medium that air will not escape in any significant quantity. Emulsification can not be carried so far that no air will escape because when oxygen is exhausted in the air by the oxidation of metal, nitrogen has to be evacuated from the leaching medium to make room for a new supply of air containing oxygen.

Therefore, it can be concluded that the oxidation efficiency will be greater as the height of the leaching vessel increases. With a 40 foot leaching vessel, little excess oxygen will escape, with adequate diminution of air bubbles through the process of homogenization of the leaching medium.

The test agitator at Stanrock Uranium Mines Ltd. had a volume of 2.12 cu. ft. A vessel of the same volume, but 40 feet high would have a diameter of 3.1 inches. The ratio of the height to diameter would be 154 to 1. As a comparison the ratio for the test agitator was only 1.5 to 1. Therefore, aeration of the leaching medium in the test agitator required a considerable excess of air. Assuming the height of the vessel is decreased by a factor of 4 and the diameter is increased by a factor of 2, the retention time would be decreased by a factor of 4, and considerably more air would be required for oxidation of the ore. It is possible to change this ratio to the point where excess oxygen is required beyond any practical consideration. Proper evaluation of air consumption should only take into consideration the quantity of air required for oxidation of the ore.

The following is a somewhat generalized example illustration of extraction of uranium from ores originating in the Blind River-Elliott Lake area of Ontario, Canada. This is the type of material being extracted by Denison Mines, Ltd. The ore is mixed with black ferric oxide and ground very finely in conventional grinding apparatus. A pulp is formed from the ground ore and there is added thereto ferrous sulphate. Air and live steam are added with rapid agitation to the pulp to which a sulphonated organic acid salt has been added. Temperature of the pulp was maintained within 160° to 180° F. This conditioned pulp is then introduced into a leaching circuit in which sulphuric acid leaching is carried out in a conventional manner with the exception that the sulphuric acid is in a concentration of 2 to 30 g. per l. or preferably 4 to 15 g. per l. compared with the prior art concentrations of 40 to 80 g. per l. This refers to grams of sulphuric acid per liter of leaching solution.

After leaching of the ore the leached solution containing oxidized uranium in solution is carried to a conventional ion exchange system for extraction of the dissolved uranium. The leaching time was generally found to be between 10 to 24 hours, although shorter times can be used to advantage where the economics indicate that this is feasible.

The leaching tank can be of a pachuca type or the turbopropeller type depending on the type of agitation desired. The pulp in this tank should be heated with steam up to 160 to 180° F. which is a practical limit from the point of view of the rubber parts of the system.

When ferrous ions or other easily oxidizable ions are present in the conditioning pulp in sufficient quantities, lime or some other hydroxyl ion producing material is added at a rate to precipitate the iron from the solution onto the surface of the ore. This precipitate covers every part of the surface of the ore, in accordance with this preferred form of the invention.

After all the iron in the solution is precipitated, manganous sulphate or manganous sulfide in finely pulverized form is added to the leaching tank along with a small amount of acid to speed its solution in the tank. After that, lime is again added until all the manganous ions are combined with hydroxyl ions and precipitated on top of the iron hydroxide lining of the ore surface. The pulp is conditioned for 3 to 24 hours with good aeration and agitation while being maintained at 160 to 180° F. until the ore is ready for leaching.

Black ferric oxide in the amount of 0.2 to 0.5% by weight of dry ore was added to the ore before grinding. The ore mix is crushed to a particle size in which 80 to 95% of the particles are below 100 mesh and 60 to 70% are below 200 mesh. The ore mix from the grinding mill is pumped to a neutral thickener and then to a repulper to obtain an ore pulp comprising 76 to 78% solids or even higher in certain cases. The ore mix then goes to a Pachuca or other tank with a provision for good aeration of the mix pulp. The ferrous or manganous sulphate or hydroxide is added at the rate of 1 to 5 pounds per ton of dry ore. Organic sulphonated acids or their salts are added as well. The ore mix is then fed by gravity to a second Pachuca tank treated with slaked lime at 160 to 180° F. at the rate of 0.5 to 6 pounds per ton of dry ore. This precipitates the iron hydroxide on the particles of the ore. Thus the particles have a first coating of black ferric oxide and a second coating of basic ferroso ferric sulphate, during the ore conditioning stage.

If steel rods and balls are employed as the grinding medium in suitable rod and ball mills to pulverise the ore, they will be continually pulverised themselves and they become the source of a substantial amount of very finely pulverised iron for the pulp, which will serve the same function as black ferric oxide. Furthermore, we may use iron scrap in convenient form as an additive to the ore before grinding for the same purpose. However, the ore itself, if rich in bivalent iron (which usually is the case), may be made easily a source of a very substantial amount of iron to be used in the process of the present invention. With finer grinding of the ore than is required by the previously practiced high strength acid leach a very substantial amount of iron bearing mineral constituents of the ore may be easily released from the ore during grinding only because of the preference of the ore particle, when adequate pressure is being exerted on it to split through its much softer iron bearing network rather than across the harder core which is lower in iron. Thus, with sufficiently advanced grinding of the ore which the process of the present invention can afford, we may be able to introduce to the ore pulp as much iron as may be required, from the ore itself.

Adding a basic material like calcium, magnesium, barium oxides, or hydroxides or some other such materials to the ore before or during grinding will result in a very effective covering of a considerable area of the finely divided ore with a coating rich in hydroxides, as required by the process of the present invention.

With such a procedure we may dispense with the addition of ferrous or manganous (ionisable) materials which might otherwise be required, if recycling of the iron-rich leaching medium from the end of the leaching circuit is not practiced.

However, the procedure disclosed herein has the considerable advantage of covering the surface of the ore with a coating of hydroxides in the grinding medium as soon as this surface is brought into existence. Furthermore, with finer grinding of the ore, by adding some effective surface tension depressants, for example the ammonium salt of dodecyl benzene sulphonate, and entraining oxygen containing gas intimately with the ore pulp in the conditioning tank with a provision for effective mixing of its contents, whether it is of the turbo-propeller type or the Pachuca type, or a combination of both types, we may easily and economically implement a very advanced stage of "emulsification" as semi-schematically represented on the FIG. 1. Thus, with finer grinding than could be economically feasible with the previously practiced methods of high strength acid leach, but which the process of the present invention renders practical, a considerably simplified embodiment of the process of the present invention can be executed.

In certain experiments the ore tested herein, averaging Sp. Gr. 2.7, is pulverized in the ball mill down to 200 mesh (and below) in 50% to 60% (by weight), and the feed pulp is maintained within the range of 75% to 77% of solids.

We may say that with such uranium bearing pulp, one cubic foot of the leaching medium, and of the leaching agitator's holding capacity, contains 0.04 (plus or minus 0.005) tons of dry ore.

Denotations; inside diameter and height of the leaching agitator let be D and H feet, respectively.

The agitator's holding capacity—M—will be expressed by the formula: No. 1—$0.01 \times 3.141592 \times D^2 \times H$ tons of dry ore.

Denotations: Intensity of air flow through the leaching medium, means volume of air in cubic feet passing through one square foot of cross section of the leaching medium, is denoted by C in feet per minute of air velocity.

Specific air requirement (also called "air consumption") means volume of air in cubic feet per ton of dry ore per minute which has to be injected at the bottom of the agitator to the leaching medium to sustain the intensity of air flow during the whole cycle of the leaching, is denoted by Q.

Total air requirement (also called "consumption") which is the volume of air in cubic feet per minute to leaching medium at the bottom of the agitator is denoted by V.

The intensity of air flow through the leaching medium C, and specific air requirement (consumption) Q, are interdependent and can not be fixed independently.

All physio-chemical considerations lead to acceptance of the intensity of air flow through the leaching medium as a major factor in the leaching of uranium ore, according to the new process.

We may express C and Q with the following formulas:

C is equal to:
$$\frac{V}{3.141592 \frac{D^2}{4}} \qquad \text{No. 2}$$

Q is equal to:
$$\frac{V}{3.141592 \frac{D^2 \times H}{4} \times 0.04} \qquad \text{No. 3}$$

These two formulas may be written in the following forms:

No. 4 $\quad \frac{3.141592 \times D^2}{V}$ is equal to: $\frac{4}{C}$

No. 5 $\quad \frac{3.141592 \times D^2}{V}$ is equal to: $\frac{100}{Q \times H}$ Henceforth, the following conclusion will be reached:

No. 6 $\quad \frac{4}{C}$ is equal to $\frac{100}{Q \times H}$ or in other words it may be said that $$Q \times H \text{ is equal to } 25 \times C \qquad \text{No. 7}$$

One may see that specific air requirement (called "consumption" heretofore) being denoted by Q cubic feet of air per ton of dry solids per minute, and with intensity of air flowing through the leaching medium at 2.4 feet per minute, all given above Formulas Nos. 1, 2, 3, 4, 5, 6 and 7 lead logically to the formula:

$$Q \text{ is equal to } 60{:}H \qquad \text{No. 8}$$

With our test work agitator for which H is equal to 1.25 feet, 60:1.25 makes: 48 cubic feet of air per ton of dry solids per minute, which may be considered apparently as uneconomical for industrial application. However, for the mill size agitators which are not less than 30 feet high, Q will be required much smaller to sustain the same intensity of air flow through the leaching medium. Q required will be equal to: 60 to 30 which makes only 2.0 cubic feet of air per ton of dry solids per minute.

It is concluded that the leaching in the mill size agitator will require 25 times less air per ton of dry ore per minute than in the testwork agitator 1.24 feet high, if the intensity of air passing through the leaching medium in both agitators is to maintain the same.

It may be stated that the requirement of air, called otherwise "consumption of air," is the air required to maintain the rate of air flow through the leaching medium, but clearly not "consumption" in chemical terms. It is dependent on the dimensions of the leaching agitator.

It may be considered as a parameter but not as a factor of independent character in the leaching process as are for instance percent of solids in the feed pulp, temperature of the leaching medium, velocity of air flowing through the leaching medium, etc.

The ore was pulverized down to 200 mesh (and below) in 50%–60% (by weight) and, accordingly, has a very extended surface exposed to the leaching medium. It may be something of the order of 10,000 up to 20,000 square yards per ton of ore. If such enormous surface area is made in direct contact with sulphuric acid solution, rapid dissolution of the material on the ore surface results. If only 3 to $4 \times 10^{-5}$ inch deep layer of the ore surface was dissolved, which may seem to be infinitely small for all practical purposes, 50 up to 100 pounds of the ore may pass into solution per ton of dry ore.

The leaching process of the present invention is based on the principle that air separates uranium ore from the liquid phase. Air is in direct contact with the ore surface, not only the liquid phase (sulphuric acid solution) as is the case with conventional strong acid leach process. To bring the air into intimate direct contact with the ore the intensity of air flow in the leaching medium should not drop below a critical value. 2.4 feet per minute may be reasonable, not only for the leaching testwork but also for industrial implementation of the process as well. It requires considerable hydrostatic pressure, for the air to reach every square inch of $5 \times 10^7$ aquare inches (per ton of dry ore) of the ore surface, not only to reach and come into permanent contact with the ore surface but to be replaced continuously by fresh air.

EXAMPLE 1

Uranium ore from Elliot Lake, Ontario, is ground together with black ferric oxide at 0.2% by weight of dry ore and the resulting mixture is pulped to 75% solids, to make the mill feed. The mill feed is ground to 90–95% by weight below 100 mesh and 60–70% by weight below 200 mesh. This mill feed is fed to pachuca #1 which is a pachuca of 200 tons capacity at a rate of 1 ton of dry ore per minute. The ore pulp is heated in pachuca #1 up to 160° F. with live steam from a pipe inserted in the pulp. Ferrous sulphate is added to the pachuca #1 at a rate of 2 lbs. per ton of dry ore. Also ammonium alkyl benzene sulphonate is added at a rate of 0.2 lb./ton of dry ore. The ore is agitated in pachuca #1 by the injection of steam and air into the pulp. The ore flows from pachuca #1 to pachuca #2 also of 200 tons capacity. Pachuca #2 is equipped with a turbo-propeller for agitation of the material. Slaked lime is added to pachuca #2 which is maintained at a temperature of 160 to 170° F. The lime is added at a rate varying between 2 and 4 lbs. per ton of ore based on calcium oxide. The amount of lime is adjusted to insure that the pH in pachuca #2 does not drop below a pH of 6. The ore pulp from pachuca #2 is driven to agitators #1 and subsequently to agitator #2, each of which has a capacity of 600 tons of dry ore. Agitators #1 and 2 are equipped with turbo-propellers with a provision for efficient aeration of the ore pulp. Air is uniformly and finely dispersed in the ore pulp. The temperature of the ore pulp in agitators #1 and 2 is maintained with live steam within 160 to 170° F. Whenever necessary pH of the ore pulp in agitator #2 may be adjusted to remain above 6 by the addition of more lime. Ferrous sulphate may be added in order to make minor adjustments if the pH rises much above 6. The ore pulp then passes into agitator #3 where sulphuric acid is added at a rate of 24 lbs. per ton of dry ore. This gives a concentration of sulphuric acid in the leaching medium of 10 grams of sulphuric acid per liter of the leaching solution. This can rise to 15 g. per l. with coarser ore grinding. The pulp from agitator #3 is driven to agitator #4 and subsequently to #5 and #6, each of which is of 600 tons capacity. The temperature in each of these agitators is maintained within 160–170° F. The above description is for a plant designed to treat 3000–4000 tons of ore per day to extract uranium. The results of the extraction process described above are shown on Table No. 1.

The following Table No. 1 shows the changes in the pulp constitution of a typical batch of uranium ore pulp extracted by the sulphuric acid leaching method, said pulp having been conditioned by the process in accordance with the present invention. In this table, g. per liter indicates grams of material per liter of leaching solution; lbs./ton indicates pounds of material per ton of dry ore.

The ore pulp is treated with slaked lime at a rate of lime flow of 1.5 to 3 lbs. in agitator No. 1 and 0.3 to 0.6 lb. in agitator No. 2 per ton of dry ore calculated on basis of 100% CaO. The rates of lime flow are however, adjusted so that the ore pulp in the agitator No. 1 and No. 2 is maintained at an acidity within respectively pH 4 to 6 and at pH 4.8 to 5.2. Sulphuric acid can be added to make adjustments to the pH as necessary.

TABLE 1

| Tank No. | Capacity, Tons (On dry ore basis) | Acidity, pH | Iron in Solution, Grams/Liter | | | Unrecovered Uranium Tailing Losses, Lbs. per Ton |
|---|---|---|---|---|---|---|
| | | | Total | Ferrous | Ferric | |
| Pachuca No. 1 | 200 | 3.0–4.0 | | | | |
| Pachuca No. 2 | 200 | 8.0–12.0 | | | | |
| Agitator No. I | 600 | 6.0–7.0 | | | | |
| Agitator No. II | 600 | 5.5–6.0 | | | | |
| | | Grams/Liter | | | | |
| Agitator No. III | 350 | 10.0–15.0 | 8.5–6.5 | 6.0–3.5 | 3.0–2.5 | 0.30–0.20 |
| Agitator No. IV | 600 | 7.0–9.0 | 7.0 6.0 | 5.9–3.4 | 1.6–1.1 | 0.12–0.10 |
| Agitator No. V | 600 | 6.0–7.5 | 6.0–5.5 | 5.4–4.5 | 1.0–0.6 | 0.08–0.07 |
| Agitator No. VI | 600 | 5.0–6.5 | 5.5–5.0 | 5.4–4.5 | 0.5–0.1 | 0.06–0.05 |

EXAMPLE 2

Uranium ore from Elliot Lake, Ontario, is ground as in Example 1 together with black ferric oxide and the ground ore is then pulped to a solid of 75–78% to make a mill feed pulp. This mill feed is fed to a pachuca #1 at a rate of 1 tone of dry ore per minute where it is heated up to 160° F. with live steam. The ore is agitated by air and steam. Sulphuric acid is added to pachuca #1 at a rate of 2–5 lbs. per tone of dry ore and also a sulphonated hydrocarbon compound was added, in this case ammonium alkyl benzene sulphonate at the rate of 0.2 lb. per ton of dry ore. The mixture from pachuca #1 is driven to pachuca #2. The acidity of the ore pulp is maintained at between pH 3.7 to 4.3 by the addition of sulphuric acid or lime whenever necessary. The temperature of the ore pulp in pachuca #2 is maintained at 165–170° F. by the use of steam. The ore pulp is then driven to agitators #1 and #2 which are equipped with turbo-propellers for the efficient aeration of the ore pulp. Air is uniformly and finely dispersed in the pulp. Slaked lime is added to agitators #1 and #2 in amounts of 2 lbs. and 0.4 lb. per ton of dry ore based on calcium oxide. The rates of lime flow are so adjusted that the ore pulp in agitators #1 and #2 are maintained at respectively pH 4.9 to 5.1 and 4.8 to 5.2. The temeprature of the ore pulp is maintained in agitators #1 and #2 at 160° to 180° F. Agitators #1 and #2 have a capacity of 600 tons each. The ore pulp is then driven to agitator #3 of 350 tons capacity and which the solids are held in suspension by vigorous agitation, either by a turbo-propeller or by aeration or a combination of these. Sulphuric acid was added to agitator #3 at a rate of 26 lbs. per tone of dry ore. The rate of the sulphuric acid flow to agitator #3 was adjusted to keep the acidity of the ore pulp at a level of 13 g. per l. of leaching solution. The temperature of the ore pulp in agitator #3 was maintained with live steam at between 160° and 170° F. The overflow from agitator #3 was driven to agitators #4, #5 and #6 successively, each of which agitators has a 600 ton capacity. The temperature in each of these agitators was maintained within 160° to 170° F. The results of this run are shown in Table 2.

TABLE 2

| Tank No. | Capacity, Tons (On dry ore basis) | Acidity, pH | Iron in Solution | | | Lbs./Ton $U_3O_8$ |
|---|---|---|---|---|---|---|
| | | | Total | Ferrous | Ferric | |
| Pachuca No. 1 | 200 | 3.3–3.7 | | | | |
| Pachuca No. 2 | 200 | 3.7–4.3 | | | | |
| Agitator No. I | 600 | 4.0–6.0 | | | | |
| Agitator No. II | 600 | 4.8–5.2 | | | | |
| | | Grams/Liter | | | | |
| Agitator No. III | 350 | 13.0–18.0 | 8.0±1.0 | 2.0–3.5 | 6.0±0.5 | 0.12–0.11 |
| Agitator No. IV | 600 | 11.0–14.0 | 7.5±0.5 | 6.7–7.0 | 0.8±0.3 | 0.10–0.09 |
| Agitator No. V | 600 | 8.0–11.0 | 7.5±0.5 | 6.5–7.2 | 0.5±0.2 | 0.08–0.07 |
| Agitator No. VI | 600 | 6.0–8.0 | 6.5±0.5 | 6.3–6.9 | 0.2±0.1 | 0.06–0.05 |

The following 11 examples (No. 3 to 13) all employ these features:

(1) The extraction of uranium from its ores was carried out in two stages. Prior to leaching in sulphuric acid solutions the ore is conditioned in accordance with the present invention.

(2) Temperature conditioning of the ore and the subsequent leaching is within the range of 160° to 180° F. Heating of the pulp is effected with live steam.

(3) The ore has a sieve analysis of 60 to 70% by weight below 200 mesh and 90 to 95% by weight below 100 mesh.

(4) The ore pulp is fed to the conditioning agitators at a density of 75–76% solid, however this may drop during conditioning to 70 to 72% solid.

(5) Sodium dioctyl sulphosuccinate is dispersed or dissolved in amounts of 0.2 to 0.5 lb. per ton of dry ore in the ore feed pulp. This is added to the pulp in a relatively small capacity, short retention time (1 to 2 hours) pachuca type tank equipped with a turbo-propeller for efficient homogenization of all phases. From this small pachuca the ore pulp is fed to a full capacity (18 to 30 hours retention time) pachuca or agitator. The latter is provided with means for a thorough aeration of the pulp. In these pachucas, the conditioning of the ore is performed with a flow of thoroughly dispersed air making its way upward from the bottom of the tanks where it is fed to the pulp. It works its way upward at a rate of 15 to 30 ft. per hour. These are the ore-conditioning pachucas or agitators and they are equipped with turbo-propellers. The ore conditioning time is from 3 to 36 hours depending on the grade and grind of the ore.

(6) From the ore conditioning agitators, the ore pulp is transferred to the leaching agitators.

These 11 examples were performed with samples of 175 lbs. size from the Stanrock Uranium Mines Ltd. in the Elliot Lake area of Ontario. The results of these have been recalculated to make them correspond to samples of 1 ton of dry ore each.

EXAMPLE 3

Ore conditioning stage

Retention time: 19 up to 24 hours. Lime consumption for condtioning 2.9 up to 3.6 lbs. of CaO (on 100% CaO basis).

Milk of lime is fed to the ore conditioning medium at a rate so adjusted that pH of the conditioning medium, at any time of retention should be as it is shown in Table 3.

TABLE 3

| Retention Time, Hours | The Rate of Lime Flow to the Pulp [1] | pH of the Ore Conditioning Medium |
|---|---|---|
| Nil—→3 | 0.30+0.20 | 6.0—→8.0 |
| 3—→6 | 0.30+0.15 | 8.0—→7.0 |
| 6—→12 | 0.20+0.10 | 7.0—→6.0 |
| 12—→18 | 0.15+0.05 | 6.0—→5.0 |
| 18—→20 | Nil+ | 5.0—→4.5 |

[1] (On 100% CaO basis) CaO lbs. per hour.

Ore leaching stage

Retention time: 41 up to 46 hours. Sulphuric acid consumption: 24 up to 30 lbs. (on 100% of $H_2SO_4$ basis).

Sulphuric acid is fed to the leaching medium at a rate so adjusted that acidity of the leaching medium at any time of retention should be as is shown in Table 4.

TABLE 4

| Retention Time, Hours | Acidity, Grams per Liter | Uranium Content In Solids [1] |
|---|---|---|
| 0—→6 | 13.0—→11.0 | |
| 6—→12 | 11.0—→10.0 | |
| 12—→18 | 10.0—→9.0 | |
| 18—→29 | 9.0—→8.0 | 0.20—→0.13 |
| 29—→40 | 8.0—→6.0 | 0.13—→0.08 |

[1] On $U_3O_8$ (lbs. per ton of dry ore) basis.

EXAMPLE 4

Ore conditioning stage

Retention time: 30 up to 35 hours. Lime consumption: 3.5–3.0 lbs. (on 100% CaO basis).

Milk of lime is fed to the conditioning medium at a rate so adjusted that pH of the conditioning medium be as it is shown in Table 5.

TABLE 5

| Retention Time, Hours | The Rate of Lime Flow to the Conditioning Medium (60 lbs. per hour) | pH of the Conditioning Medium |
|---|---|---|
| 0—→3 | 0.1 up to 0.2 lb | 6.0—→10.0 |
| 3—→6 | do | 10.0—→8.0 |
| 6—→12 | do | 8.0—→6.0 |
| 12—→30 | do | 6.0—→5.0 |

Ore leaching stage

Retention time: 30 up to 35 hours. Sulphuric acid consumption: 30–32 lbs. (on 100% of $H_2SO_4$ basis).

Sulphuric acid is fed to the leaching medium at a rate so adjusted that acidity of the leaching medium should be as it is shown in Table 6.

TABLE 6

| Retention Time, Hours | Acidity, Grams per Liter | Uranium Content in Solids [1] |
|---|---|---|
| 0—→6 | 15.0—→13.0 | |
| 6—→18 | 13.0—→12.0 | 0.20—→0.13 |
| 18—→30 | 12.0—→10.0 | 0.13—→0.07 |

[1] On $U_3O_8$ lbs. per ton of dry ore basis.

EXAMPLE 5

Ore conditioning stage

Retention time: 20 up to 25 hours. Ferrous sulphate consumption: 9.0 up to 10.0 lbs. Lime consumption: 5.0 up to 6.0 lbs.

Ferrous sulphate is dissolved in the conditioning medium at a rate 15 lbs. per hour to the total: 9.0 up to 10.0 lbs. during less than one hour. Thereafter, milk of lime is fed to the conditioning medium during four up to five hours, at a rate (1.5 down to 0.9 lbs. per hour) so adjusted that pH of the conditioning medium will not exceed: 10.0, and conditioning of the ore will be finished at pH within the range: 4.0 up to 4.6.

Ore leaching stage

Retention time: 40 up to 45 hours. Sulphuric acid consumption for leaching the conditioned ore: 24 up to 25 lbs. (on 100% $H_2SO_4$ basis).

Sulphuric acid is fed to the leaching medium at a rate so adjusted that acidity of the leaching medium should be, as it is shown in Table 7.

TABLE 7

| Retention Time, Hours | Acidity, Grams per Liter | Uranium Content in Dry Solids [1] |
|---|---|---|
| 0—→6 | 14.0—→10.0 | |
| 6—→12 | 10.0—→9.0 | 0.22—→0.15 |
| 12—→28 | 9.0—→6.0 | 0.15—→0.08 |
| 28—→40 | 6.0—→5.0 | 0.08—→0.05 |

[1] On $U_3O_8$ (lbs. per ton of dry ore basis).

EXAMPLE 6

Ore conditioning stage

Retention time: 18 up to 23 hours. Ferrous sulphate consumption: 10.0 up to 2.0 lbs. Lime consumption: 5.0 up to 6.0 lbs.

Ferrous sulphate is dissolved during 18 hours in the conditioning medium progressively at a rate: 0.5 up to 0.7 lb. per hour.

Concurrently, milk of lime is fed to the conditioning medium at a rate (corresponding to 1.0→0.01 lbs. of CaO per hour, as required) so adjusted that pH of the conditioning medium should always be maintained within the range: not more than 6.0 and not less than 5.0.

Ore leaching stage

Retention time: 42 up to 47 hours. Sulphuric acid consumption for leaching the condition ore: 24 up to 26 lbs. (on 100% $H_2SO_4$ basis). Sulphuric acid is fed to the leaching medium at a rate so adjusted that acidity of the leaching medium should be, as it is shown in Table 8.

TABLE 8

| Retention Time, Hours | Acidity, Grams per Liter | Uranium Content in Dry Solids [1] |
|---|---|---|
| 0→18 | 12.0→7.0 | 0.40→0.12 |
| 18→30 | 7.0→6.0 | 0.12→0.08 |
| 30→42 | 6.0→5.0 | 0.08→0.05 |

[1] On $U_3O_8$ (lbs. per ton of dry ore basis).

EXAMPLE 7

Ore conditioning stage

Retention time: 21 up to 26 hours. Ferrous sulphate consumption: 5.0 up to 5.5 lbs. Lime consumption: 2.5 up to 3.0 lbs.

Ferrous sulphate is dissolved in the conditioning medium at a rate: 0.25 lb. per hour to the total: 5.0 up to 5.5 lbs. during 21 hours.

Milk of lime is fed to the conditioning medium at a rate (1.00–0.01 lbs. of CaO per hour) so adjusted that pH of the conditioning medium should be, as it is shown in Table 9.

TABLE 9

| Retention Time, Hours | pH of the conditioning medium |
|---|---|
| 0→10 | Not more than 8.0 and not less than 6.0. |
| 10→15 | Not more than 8.0 and not less than 5.5. |
| 15→21 | Not more than 5.5 and not less than 4.0. |

Ore leaching stage

Retention time: 39–44 hours. Sulphuric acid consumption for leaching the conditioned ore: 25 up to 27 lbs. (on 100% of $H_2SO_4$ basis).

Sulphuric acid is fed to the leaching medium at a rate so adjusted that acidity of the leaching medium should be as it is shown in Table 10.

TABLE 10

| Retention Time, Hours | Acidity, Grams per Liter | Uranium Content in Dry Solids [1] |
|---|---|---|
| 0→16 | 13.0→8.0 | |
| 16→28 | 8.0→7.0 | 0.12→0.10 |
| 28→40 | 7.0→5.0 | 0.10→0.08 |

[1] On $U_3O_8$ (lbs. per ton of dry ore basis).

EXAMPLE 8

Ore conditioning stage

Retention time. 24 up to 29 hours. Ferrous sulphate consumption 6.0 up to 7.0 lbs. Lime consumption 4.0 up to 4.5 lbs.

Ferrous sulphate is dissolved in the conditioning medium at a rate: 10 lbs. per hour to the total: 6.0 up to 7.0 lbs. during less than one hour.

Thereafter, milk of lime is fed to the conditioning medium at a rate: 1.0 down to 0.5 lb. of CaO per hour, to the total 4.0 up to 4.5 lbs. during six hours only. However, pH of the conditioning medium must not exceed: 10.0.

Thereafter, milk of lime is fed to the ore pulp if necessary, to maintain pH of the conditioning medium at not less than: 4.5, but no more than 6.0.

Ore leaching stage

Retention time: 36 up to 41 hours. Sulphuric acid consumption for leaching: 25 up to 27 lbs. (on 100% of $H_2SO_4$ basis). Sulphuric acid is fed to the leaching medium at a rate so adjusted that acidity of the leaching medium should be as it is shown in Table 11.

TABLE 11

| Retention Time, Hours | Acidity, Grams per Liter | Uranium Content in Dry Solids [1] |
|---|---|---|
| 0→3 | 8.0–9.0 | |
| 3→6 | 8.0–9.0 | |
| 6→9 | 8.0–9.0 | |
| 9→12 | 8.0–9.0 | |
| 12→24 | 7.0–8.0 | 0.14→0.11 |
| 24→36 | 5.0–6.0 | 0.11→0.07 |

[1] On $U_3O_8$ (lbs. per ton of dry ore basis).

EXAMPLE 9

Ore conditioning stage

Retention time: 24 up to 29 hours. Ferrous sulphate consumption: 10.0 up to 12.0 lbs. Lime consumption: 5.0 up to 6.0 lbs.

Ferrous sulphate is dissolved in the conditioning medium at a rate: 15 lbs. per hour to the total: 10.0 up to 12.0 lbs. during less than one hour.

Thereafter, milk of lime is fed to the conditioning medium at a rate: 1.7 up to 2.0 lbs. of CaO per hour to the total: 5.0 up to 6.0 lbs. during three hours only.

However, pH of the conditioning medium is not allowed to exceed: 10.0 during remaining 20 hours of ore conditioning, lime is fed to the conditioning medium, if necessary only, to maintain pH of the conditioning medium at not less than: 4.5. However, pH=5.0 must not be exceeded at the end of ore conditioning.

Ore leaching stage

Retention time: 36 up to 41 hours. Sulphuric acid consumption for leaching the conditioned ore: 22 up to 26 lbs. (on 100% $H_2SO_4$ basis). Sulphuric acid is fed to the leaching medium at a rate so adjusted that acidity of the leaching medium should be as shown in Table 12.

TABLE 12

| Retention Time, Hours | Acidity, Grams per Liter | Uranium Content in Dry Solids [1] |
|---|---|---|
| 0→12 | 13.0→7.0 | |
| 12→24 | 7.0→6.0 | 0.11→0.08 |
| 24→36 | 6.0→5.0 | 0.08→0.05 |

[1] On $U_3O_8$ (lbs. per ton of dry ore basis).

EXAMPLE 10

Ore conditioning stage

Retention time: 30 up to 35 hours. Ferrous sulphate consumption 2.5–3.0 lbs. Lime consumption: 2.5–3.0 lbs.

Ferrous sulphate is dissolved in the conditioning medium at a rate: 0.40–0.50 lbs. per hour to the total: 2.5–3.0 lbs. during first six hours of ore conditioning. Concurrently, milk of lime is fed to the conditioning medium at a rate (0.5–0.81 lbs. of CaO per hour as required) so adjusted that pH of the conditioning medium be maintained within the range: not more than 6.0, and not less than 5.0.

During the remaining 24 hours of conditioning of the ore milk of lime is used, if necessary, to keep pH at not less than: 4.5. However, pH must not exceed: 5.0.

Ore leaching stage

Retention time: 30 up to 35 hours. Sulphuric acid consumption: 30–32 lbs. (on 100% of $H_2SO_4$ basis).

Sulphuric acid is fed to the leaching medium at a rate so adjusted that acidity of the leaching medium be as it is shown in Table 13.

TABLE 13

| Retention Time, Hours | Acidity, Grams per Liter | Uranium Content in Dry Solids [1] |
|---|---|---|
| 0→6 | 13.0→10.0 | |
| 6→18 | 10.0→8.5 | 0.15→0.10 |
| 19→30 | 8.5→7.0 | 0.10→0.05 |

[1] On $U_3O_8$ (lbs. per ton of dry ore basis).

EXAMPLE 11

Ore conditioning stage

Retention time: 20 up to 25 hours.

Ferrous sulphate is not used. Sulphuric acid is fed (total: 2.0 up to 3.0 lbs.) to the conditioning medium during first hour. Thereafter, milk of lime is fed to the conditioning medium at a rate (1.10 down to 0.01 lbs. CaO as required) per hour so adjusted that pH of the conditioning medium should be always within the range: not more than 4.5, and not less than 4.0.

Total line consumption for conditioning of the ore: 1.4 up to 1.6 lbs.

Ore leaching stage

Retention time: 40 up to 45 hours. Sulphuric acid consumption for leaching the conditioned ore: 29 up to 34 lbs. (on 100% of $H_2SO_4$ basis).

Sulphuric acid is fed to the leaching medium at a rate so adjusted that acidity of the leaching medium should be as it is shown in Table 14.

TABLE 14

| Retention Time, Hours | Acidity, Grams per Liter | Uranium Content in Dry Solids [1] |
|---|---|---|
| 0 → 16 | 18.0 → 12.0 | |
| 16 → 28 | 12.0 → 10.0 | 0.13 → 0.09 |
| 28 → 40 | 10.0 → 8.0 | 0.09 → 0.06 |

[1] On $U_3O_8$ (lbs. per ton of dry ore basis).

EXAMPLE 12

Ore conditioning stage

Retention time: 36 up to 40 hrs.

Ferrous sulphate is not used. Sulphuric acid is fed (total: 2.0 up to 3.0 lbs.) to the conditioning medium during first two hours. Thereafter milk of lime is fed to the conditioning medium at a rate (0.1 down to 0.01 lbs. CaO, as required, per hour) so adjusted that pH of the ore conditioning medium should always be within the range: not less than 4.0 and not more than 4.5.

Total line consumption for conditioning of the ore: 1.5 up to 1.7 lbs.

Ore leaching stage

Retention time: 24 up to 30 hours. Sulphuric acid consumption for leaching the conditioned ore: 29 up to 34 lbs. (of 100% on $H_2SO_4$ basis).

Sulphuric acid is fed to the leaching medium at a rate so adjusted that acidity of the leaching medium should be as it is shown in Table 15.

TABLE 15

| Retention Time, Hours | Acidity, Grams per Liter | Uranium Content in Dry Solids [1] |
|---|---|---|
| 0 → 12 | 18.0 → 13.0 | |
| 12 → 24 | 13.0 → 12.0 | 0.14 → 0.06 |

[1] On $U_3O_8$ (lbs. per ton of dry ore basis).

EXAMPLE 15

Ore conditioning stage

Retention time: 35 up to 40 hours.

Ferrous sulphate is not used. Sulphuric acid is fed (1.2 up to 1.5 lbs. total) to the conditioning medium during first two hours. Thereafter, milk of lime is fed to the conditioning medium at a rate (0.1 down to 0.01 lbs. CaO per hour as required) so adjusted that pH of the conditioning medium should always be within the range: not less than 4.0 and not more than 4.5. Total lime consumption for conditioning of the are: 1.5 up to 1.7 lbs.

Ore leaching stage

Retention time: 25 up to 30 hours. Sulphuric acid consumption for leaching the conditioned are: 29 up to 34 lbs. (on 100% $H_2SO_4$ basis).

Sulphuric acid is fed to the leaching medium at a rate so adjusted that acidity of the leaching medium should be as it is shown in Table 16.

TABLE 16

| Retention Time, Hours | Acidity, Grams per Liter | Uranium Content in Solids [1] |
|---|---|---|
| 0 → 13 | 15.0 → 12.0 | |
| 13 → 25 | 12.0 → 9.0 | 0.10 → 0.08 |

[1] On $U_3O_8$ (lbs. per ton of dry ore) basis.

EXAMPLES 16 TO 27

These examples used on samples of ore from Denison Mines Ltd. at Elliot Lake, Ontario, in a small experimental pachuca which was filled within 30 inches of the top with neutral disc pulp at 1.940 density. The estimated weight of dry ore in the pachuca was 80 kg. The pulp was heated to 170° F. and 200 g. of $FeSO_4$ was added to give approximately 3 g. of iron per litre of solution. While ferrous sulphate was added to the pulp in these tests, the same amount of soluble iron could be obtained from the particular ore samples employed in these experiments by recycling approximately 50% of the pulp at the end of the leaching through the recycle.

Approximately 10 g. of surface active agent corresponding to 0.2 lb. per ton of dry ore, was mixed with 100 cc. of warm water and added to the pulp. The surface active agent employed here was ammonium dodecyl benzenesulphonate.

With the aeration produced by the agitation, the pulp immediately expanded by two inches in the pachuca, which was equivalent to 10% increase in volume of the pulp. Examinations show that the pulp was permeated with extremely small bubbles of air. After vigorous mixing with the propeller for one hour the pH went down from 5 to 2.5 and lime was then added to keep the pH within the range of 3.6 to 5.5, with the final pH being about 3.6. The temperature was controlled at 170° F. Total lime consumption in these experiments did not exceed 0.8 lb. per ton of dry ore on the basis of calcium oxide.

In the second stage, which is the principal leaching stage 900 ml. of 96% sulphuric acid ($H_2SO_4$) corresponding to approximately 40 lbs. of 100% pure acid per ton of dry ore was added to the pulp. The temperature of the pulp was maintained at 170° F. The density was kept as high as possible and not less than 76% solids in the pulp. The experiments were performed with retention time in the conditioning stage varying from 3 to 32 hours and in the subsequent leaching stage within 16 to 45 hours, so that the total retention time of both stages conditioning plus leaching was always maintained at 48 hours. It was found that by increasing the retention time of the conditioning stage from 3 hours up to 12 hours, the oxidation of the ore in the pulp levelled off considerably.

During the conditioning stage the extremely extensive surface of the finely pulverized ore is being covered thinly by a durable chemically active protective substance. I believe that the substance immunizes the extensive surface of the ore against the rapid polarization during leaching which was typical of the previously practiced methods of high strength and acid leach. I have found that even with very short retention times of less than three hours of conditioning which apparently results in 65% oxidation of the ore, the oxidation proceeds during the leaching stage so that at the end of the leaching the ore obtains up to 95% of oxidation which has not been previously feasible. The result is that a very effective solution of the uranium from its ore in the leaching medium is achieved with a relatively low concentration of acids. For example, it is found that under certain conditions there is only 4–6 g. of acid per liter at the end of the leaching stage.

FIG. 3 shows graphically the results tabled in Table 17.

TABLE 17

| Graphic Symbol | Example Number | Retention time in hrs. Conditioning | Retention time in hrs. Leaching | Surfactant in lb./ton of ore | Calcium oxide in lbs./ton | $Fe^{++}$ ions in solution, g./l. | Uranium recovery from ore, percent |
|---|---|---|---|---|---|---|---|
| H | 16 | 30 | 18 | 0.05 | 1.0–2.0 | Fe 3 | 97.5 |
| ⊥ | 17 | 32 | 16 | 0.2 | 1.0–2.0 | Fe 3 | 97.3 |
| ǂ | 18 | 22 | 26 | 0.2 | 1.0–2.0 | Fe 3 | 97.6 |
| ┬ | 19 | 20 | 28 | 0.2 | 1.0–2.0 | Fe 3 | 97.1 |
| □ | 20 | 16 | 32 | 0.2 | 1.0–2.0 | Fe 3 | 97.2 |
| ▽ | 21 | 14 | 34 | 0.2 | 1.0–2.0 | Fe 3 | 97.6 |
| • | 22 | 12 | 36 | 0.2 | 1.0–2.0 | Fe 3 | 97.6 |
| × | 23 | 8 | 40 | 0.2 | 1.0–2.0 | Fe 3 | 97.2 |
| O | 24 | 6 | 42 | 0.2 | 1.0–2.0 | Fe 3 | 97.6 |
| ǂ | 25 | 3 | 45 | 0.2 | 1.0–2.0 | Fe 3 | 97.6 |
| ⊙ | 26 | 13 | 35 | None | None | Traces | 92.0 |
| ⊙/ | 27 | 32 | 16 | None | 1.0–2.0 | do | 93.3 |

I claim:
1. A method of extracting uranium values from uranium-bearing materials which comprises:
   (1) forming an aqueous ore pulp of finely ground particles of a uranium-bearing material, said finely ground particles having a coating of iron hydroxide on the surface thereof,
   (2) adding to said aqueous ore pulp a surface tension depressant comprising a sulfonated organic acid,
   (3) entraining an oxygen-containing gas intimately with said ore pulp at a temperature ranging between 160–180° F. to oxidize the uranium values in said finely ground particles; and
   (4) treating the uranium-bearing materials with an aqueous acidic leaching solution comprising sulfuric acid, present in amounts of 2–30 g./l. of said solution to obtain the uranium values from said ore.

2. The method of claim 1 wherein the forming of the aqueous ore pulp comprises:
   (a) reducing uranium-bearing materials to particles, 80–94% of which have a size below 100 mesh and 60–70% of which have a size below 200 mesh in the presence of iron oxide present in amounts of 0.2–0.5% by weight of said uranium-bearing materials,
   (b) adding water to said particles to form an aqueous ore pulp, and
   (c) adding to said aqueous ore pulp basic material selected from the group consisting of ammonia, ammonium hydroxide, the oxide of sodium, magnesium, potassium, barium and calcium and the hydroxide of sodium, magnesium, potassium, barium and calcium in amounts sufficient to maintain the pH of the ore pulp between 3–8 and to precipitate iron hydroxide on the surface of said particles.

3. The method of claim 1 wherein sulfonated organic acid added in step (2) is selected from the group consisting of sodium dioctyl sulfosuccinate, sodium dihexyl sulfosuccinate, disodium N-octadecyl sulfosuccinate, sodium isopropyl naphthalene sulfonate, ammonium dodecyl benzene sulfonate, alkyl substituted sulphonated benzene, alkyl substituted sulphonated naphthalene and sulphonic acid and disulphonic acid and the sodium salt of said acids, said sulfonated organic acid being added in amounts of 0.01–0.25 lb./ton dry uranium-bearing material.

4. The method of claim 1 wherein uranium-bearing materials are treated in step (4) with an acidic leaching solution at a temperature of 160–180° F., said acidic leaching solution having a pH ranging from 0.7–2.0.

5. The method of claim 1 wherein the acidic leaching solution comprises sulfuric acid present in amounts of 4–15 g./l. of said solution.

References Cited

UNITED STATES PATENTS

| 3,273,972 | 9/1966 | Campbell et al. | 23—322 |
| 3,250,589 | 5/1966 | Meyer | 23—312 |
| 2,738,253 | 3/1956 | Thunaes et al. | 23—323 |
| 2,736,634 | 2/1956 | Gaudin et al. | 23—333 |

FOREIGN PATENTS 269,068  10/1963  Australia.

BENJAMIN R. PADGETT, Primary Examiner
M. J. McGREAL, Assistant Examiner

U.S. Cl. X.R.
23—321, 323

UNITED STATES PATENT OFFICE
CERTIFICATE OF CORRECTION

Patent No. 3,488,162 January 6, 1970

Adam E. Sierzputowski

It is certified that error appears in the above identified patent and that said Letters Patent are hereby corrected as shown below:

In the heading, after "Ontario, Canada" insert -- , assignor to S.A. Atometals (Proprietary) Limited, Johannesburg, Republic of South Africa --.

Signed and sealed this 2nd day of June 1970.

(SEAL)
Attest:

Edward M. Fletcher, Jr.  WILLIAM E. SCHUYLER, JR.
Attesting Officer  Commissioner of Patents